(12) United States Patent
Brewbaker et al.

(10) Patent No.: US 11,220,970 B1
(45) Date of Patent: Jan. 11, 2022

(54) SYSTEM AND METHOD FOR CONTROLLING BOOST PRESSURE

(71) Applicant: Ford Global Technologies, LLC, Dearborn, MI (US)

(72) Inventors: Thomas Alan Brewbaker, Plymouth, MI (US); Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/993,461

(22) Filed: Aug. 14, 2020

(51) Int. Cl.
*F02D 41/00* (2006.01)
*F02D 23/00* (2006.01)
*B60W 50/00* (2006.01)
*F02D 41/22* (2006.01)

(52) U.S. Cl.
CPC ........... *F02D 41/221* (2013.01); *F02D 23/00* (2013.01); *F02D 41/0007* (2013.01); *F02D 41/0087* (2013.01); *B60W 2050/001* (2013.01); *B60W 2050/0008* (2013.01); *B60W 2050/0009* (2013.01)

(58) Field of Classification Search
CPC .... F02D 41/221; F02D 23/00; F02D 41/0087; F02D 41/0007; F02D 41/22; F02D 35/00; F02D 35/0007; F02D 35/0015; F02D 35/0023; B60W 2050/001; B60W 2050/008; B60W 2050/0009

USPC .......................................................... 60/603
See application file for complete search history.

(56) References Cited

U.S. PATENT DOCUMENTS

| | | | |
|---|---|---|---|
| 6,178,749 B1* | 1/2001 | Kolmanovsky | F02D 41/0007 60/605.2 |
| 6,424,906 B1* | 7/2002 | Zhu | F02D 41/1401 700/34 |
| 7,159,551 B2 | 1/2007 | Cecur et al. | |
| 7,404,383 B2 | 6/2008 | Elendt | |
| 9,605,603 B2 | 3/2017 | Glugla et al. | |
| 9,909,490 B2* | 3/2018 | Hand, III | F02D 41/0007 |
| 10,095,232 B1* | 10/2018 | Arbuckle | B63H 21/21 |
| 2009/0005886 A1* | 1/2009 | Gao | G06F 17/10 700/29 |
| 2017/0106869 A1* | 4/2017 | Lavoie | B60W 10/18 |
| 2020/0158032 A1* | 5/2020 | Lawrence | F02M 25/00 |
| 2020/0355130 A1* | 11/2020 | Magner | F01N 13/009 |

* cited by examiner

*Primary Examiner* — J. Todd Newton
(74) *Attorney, Agent, or Firm* — Geoffrey Brumbaugh; McCoy Russell LLP

(57) ABSTRACT

Methods and systems for an engine controller are described. In one example, the engine controller includes a reference control system and a disturbance rejection control system. The engine controller avoids use of integral feedback in the reference control system, while permitting integral feedback in the disturbance rejection control system, to improve controller response without unduly increasing engine pumping work.

20 Claims, 4 Drawing Sheets

SYSTEM AND METHOD FOR CONTROLLING BOOST PRESSURE

BACKGROUND/SUMMARY

An internal combustion engine may include a turbocharger to improve engine performance. The turbocharger may include a compressor to create boost (e.g., pressurized air). The boost may be complemented by fuel injected to engine cylinders to provide a combustible air-fuel mixture within the engine's cylinders. The boost pressure may be adjusted based on engine speed and engine load. For example, boost pressure may be increased if engine load is increased. The boost pressure may be increased via adjusting a position of vanes or a waste gate. It may be desirable to provide a rapid response to a boost pressure increase request so that turbocharger lag may be reduced; however, a tradeoff between boost pressure response and engine pumping work during transient operating conditions may cause engine pumping work to increase. The increased engine pumping work may reduce engine fuel efficiency. One way to control boost pressure is to apply a proportional/integral controller to provide closed loop control of boost pressure. But, a linear control that includes integral feedback on control error may be a suboptimal solution to boost pressure response versus engine pumping work. Therefore, it may be desirable to provide a way of improving boost pressure response without significantly increasing engine pumping work.

The inventors herein have recognized the above-mentioned disadvantages and have developed a method for operating an engine, comprising: adjusting a state of the engine via a reference control system and a disturbance rejection control system, where the reference control system does not include integral feedback and where the disturbance rejection control system includes integral feedback.

By adjusting a state of the engine via a reference control system and a disturbance rejection control system, it may be possible to improve engine response while reducing a decrease in engine efficiency. In particular, the reference control system may not include integral feedback so that operating the engine at sub-optimal conditions may be avoided. In addition, the disturbance rejection control system may include integral feedback so that error between a desired state of a plant and the actual state of the plant may be reduced to zero.

The present description may provide several advantages. In particular, the approach may improve engine response. In addition, the approach may reduce decreases in engine efficiency while improving engine response. Further, the approach compensates for asymmetric pumping work during increases in engine speed and decreases in engine speed.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
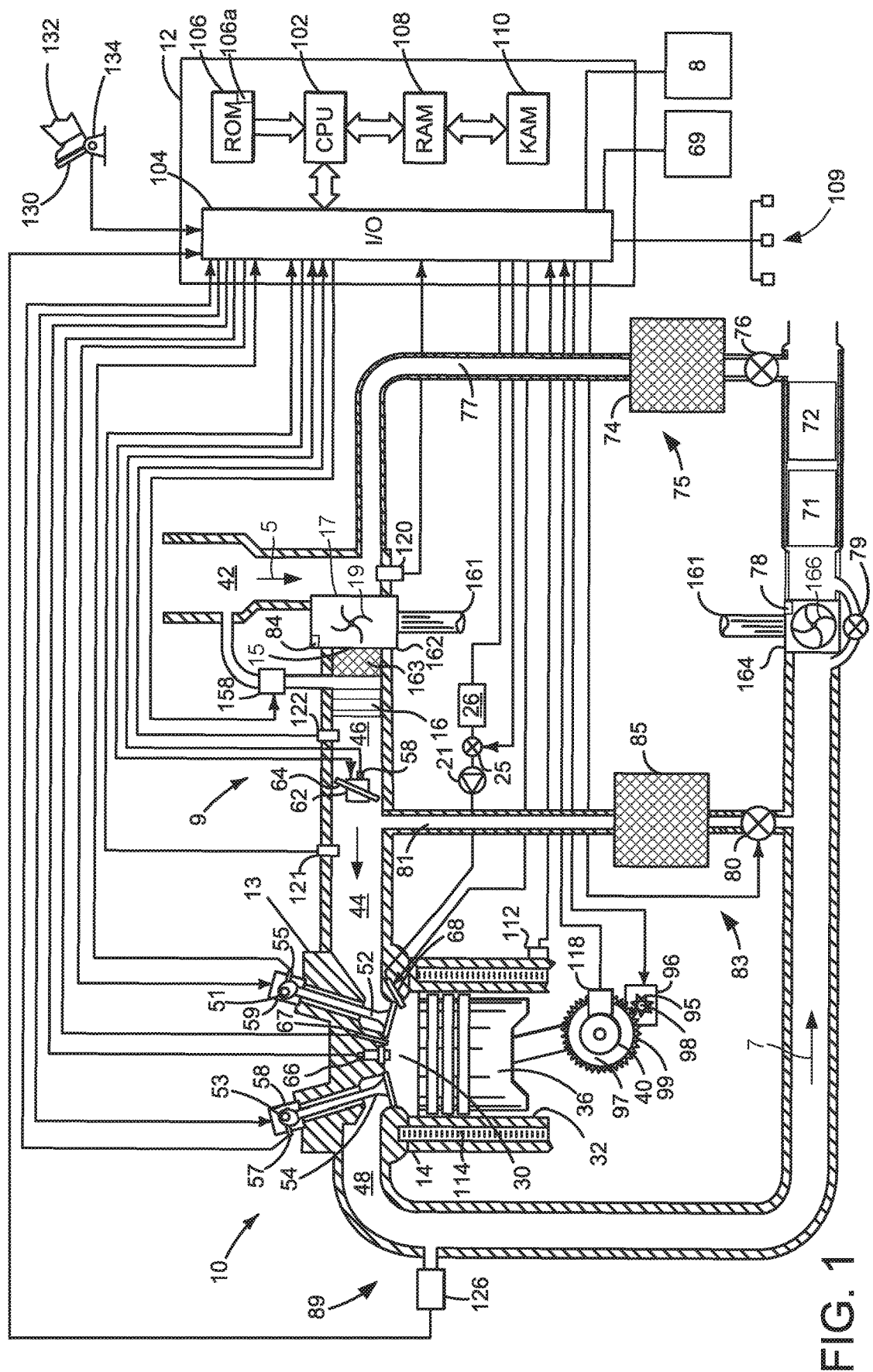
FIG. 1 shows a detailed schematic depiction of an example engine.
Figure 2:
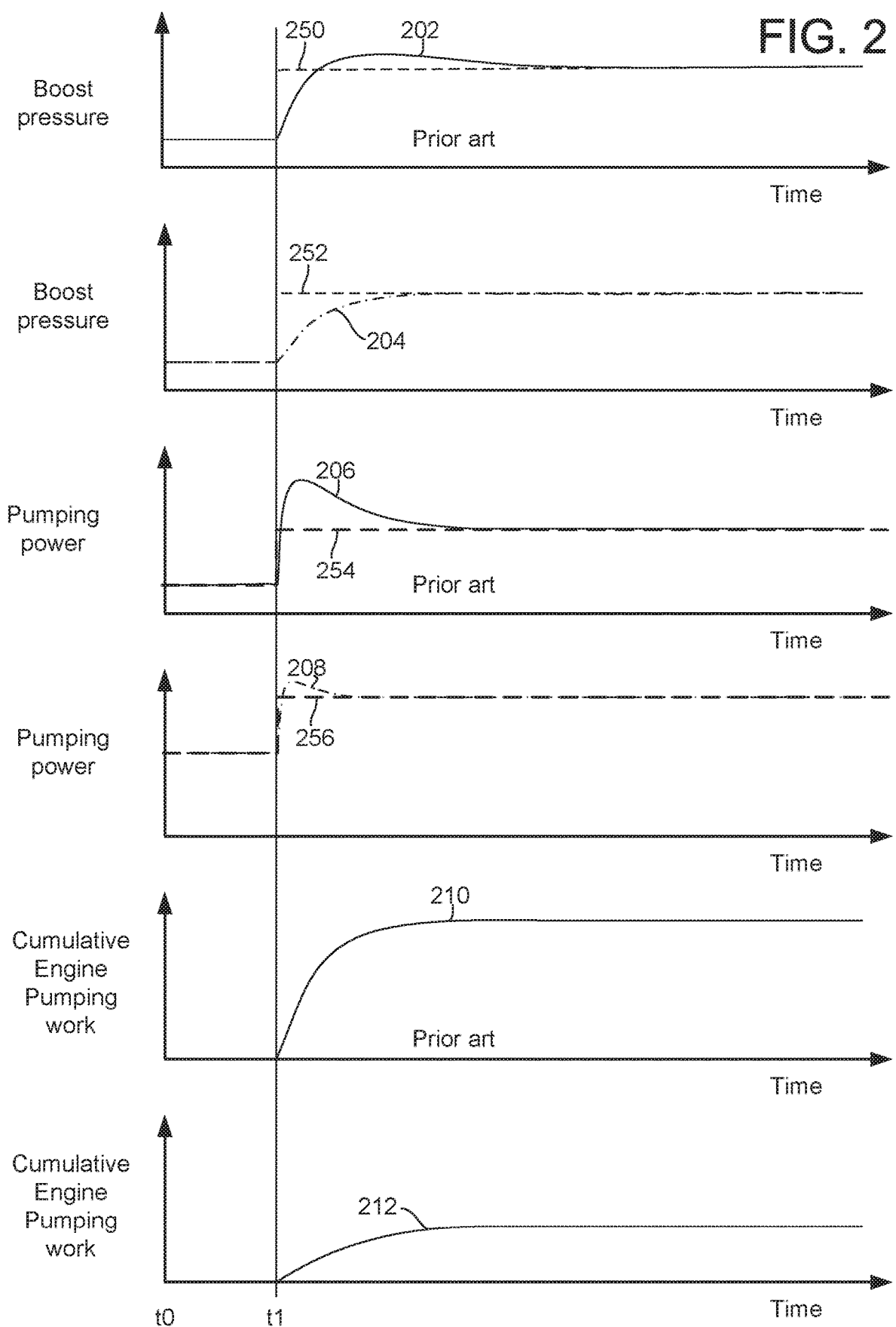
FIG. 2 shows an example engine operating sequence according to the controller of FIG. 4.
Figure 3:
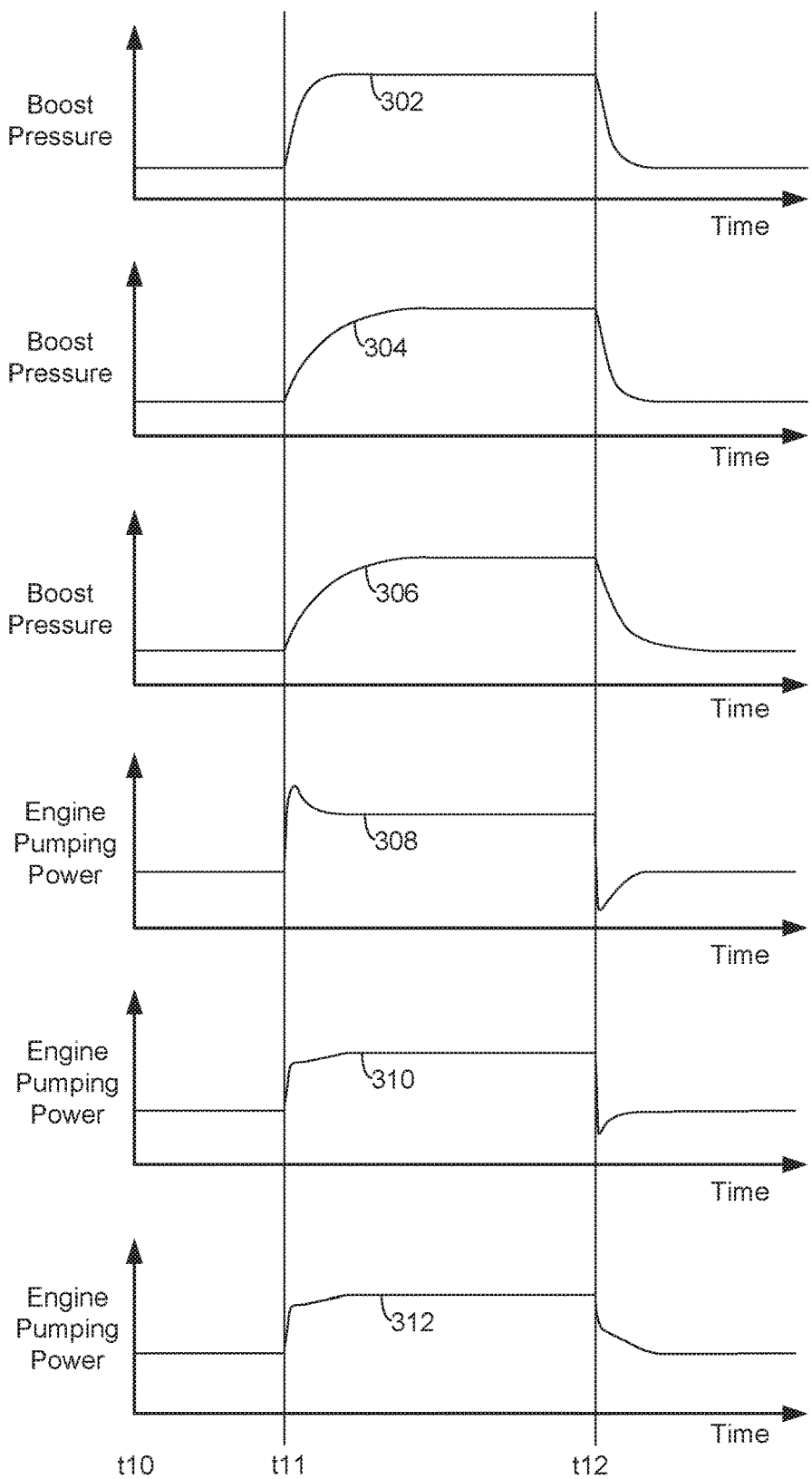
FIG. 3 shows an example engine operating sequence according to the controller of FIG. 4.

The present description is related to controlling one or more operating states of an engine. In one example, operating states of an engine, such as the engine shown in FIG. 1, are adjusted via a controller. The controller may operate as shown in FIGS. 2 and 3. The controller may be of the form shown in FIG. 4.

Referring to FIG. 1, internal combustion engine 10, comprising a plurality of cylinders, one cylinder of which is shown in FIG. 1, is controlled by electronic engine controller 12. The controller 12 receives signals from the various sensors of FIG. 1 and employs the various actuators of FIG. 1 to adjust engine operation based on the received signals and instructions stored on a memory of the controller.

Engine 10 includes combustion chamber 30 and cylinder walls 32 with piston 36 positioned therein and connected to crankshaft 40. Cylinder head 13 is fastened to engine block 14. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Although in other examples, the engine may operate valves via a single camshaft or pushrods. The position of intake cam 51 may be determined by intake cam sensor 55. The position of exhaust cam 53 may be determined by exhaust cam sensor 57. Intake poppet valve 52 may be operated by a variable valve activating/deactivating actuator 59, which may be a cam driven valve operator (e.g., as shown in U.S. Pat. Nos. 9,605,603; 7,404,383; and 7,159,551 all of which are hereby fully incorporated by reference for all purposes). Likewise, exhaust poppet valve 54 may be operated by a variable valve activating/deactivating actuator 58, which may a cam driven valve operator (e.g., as shown in U.S. Pat. Nos. 9,605,603; 7,404,383; and 7,159,551 all of which are hereby fully incorporated by reference for all purposes). Intake poppet valve 52 and exhaust poppet valve 54 may be deactivated and held in a closed position preventing flow into and out of cylinder 30 for one or more entire engine cycles (e.g. two engine revolutions), thereby deactivating cylinder 30. Flow of fuel supplied to cylinder 30 may also cease when cylinder 30 is deactivated.

Fuel injector 68 is shown positioned in cylinder head 13 to inject fuel directly into combustion chamber 30, which is known to those skilled in the art as direct injection. Fuel is delivered to fuel injector 68 by a fuel system including a fuel tank 26, fuel pump 21, fuel pump control valve 25, and fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Engine air intake system 9 includes intake manifold 44, throttle 62, grid heater 16, charge air cooler 163, turbocharger compressor 162, and intake plenum 42. Intake manifold 44 is shown communicating with optional electronic throttle 62 which adjusts a position of throttle plate 64 to control air flow from intake boost chamber 46. Compressor 162 draws air from air intake plenum 42 to supply boost chamber 46. Compressor vane actuator 84 adjusts a position of compressor vanes 19. Exhaust gases spin turbine 164 which is coupled to turbocharger compressor 162 via shaft 161. In some examples, a charge air cooler 163 may be provided. Further, an optional grid heater 16 may be provided to warm air entering cylinder 30 when engine 10 is being cold started.

Compressor speed may be adjusted via adjusting a position of turbine variable vane control actuator 78 or compressor recirculation valve 158. In alternative examples, a waste gate 79 may replace or be used in addition to turbine variable vane control actuator 78. Turbine variable vane control actuator 78 adjusts a position of variable geometry turbine vanes 166. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, wastegate 79 or a bypass valve may allow exhaust gases to flow around turbine 164 so as to reduce the amount of energy supplied to the turbine. Compressor recirculation valve 158 allows compressed air at the outlet 15 of compressor 162 to be returned to the inlet 17 of compressor 162. Alternatively, a position of compressor variable vane actuator 78 may be adjusted to change the efficiency of compressor 162. In this way, the efficiency of compressor 162 may be reduced so as to affect the flow of compressor 162 and reduce the possibility of compressor surge. Further, by returning air back to the inlet of compressor 162, work performed on the air may be increased, thereby increasing the temperature of the air. Air flows into engine 10 in the direction of arrows 5.

Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99 such that starter 96 may rotate crankshaft 40 during engine cranking. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. An engine start may be requested via human/machine interface (e.g., key switch, pushbutton, remote radio frequency emitting device, etc.) 69 or in response to vehicle operating conditions (e.g., brake pedal position, accelerator pedal position, battery SOC, etc.). Battery 8 may supply electrical power to starter 96. Controller 12 may monitor battery state of charge.

Combustion is initiated in the combustion chamber 30 when fuel automatically ignites via combustion chamber temperatures reaching the auto-ignition temperature of the fuel that is injected to cylinder 30. The temperature in the cylinder increases as piston 36 approaches top-dead-center compression stroke. Exhaust gases may be processed via exhaust system 89, which may include sensors and emissions control devices as described herein. In some examples, a universal Exhaust Gas Oxygen (UEGO) sensor 126 may be coupled to exhaust manifold 48 upstream of emissions device 71. In other examples, the UEGO sensor may be located downstream of one or more exhaust after treatment devices. Further, in some examples, the UEGO sensor may be replaced by a NOx sensor that has both NOx and oxygen sensing elements.

At lower engine temperatures optional glow plug 66 may convert electrical energy into thermal energy so as to create a hot spot next to one of the fuel spray cones of an injector in the combustion chamber 30. By creating the hot spot in the combustion chamber next to the fuel spray 30, it may be easier to ignite the fuel spray plume in the cylinder, releasing heat that propagates throughout the cylinder, raising the temperature in the combustion chamber, and improving combustion. Cylinder pressure may be measured via optional pressure sensor 67, alternatively or in addition, sensor 67 may also sense cylinder temperature. Exhaust temperature may be determined via temperature sensor 91. Emissions device 71 may include an oxidation catalyst and it may be followed by a selective catalytic reduction (SCR) catalyst or other exhaust gas after treatment device 72.

Exhaust gas recirculation (EGR) may be provided to the engine via high pressure EGR system 83. High pressure EGR system 83 includes valve 80, EGR passage 81, and EGR cooler 85. EGR valve 80 is a valve that closes or allows exhaust gas to flow from upstream of emissions device 71 to a location in the engine air intake system downstream of compressor 162. EGR may be cooled via passing through EGR cooler 85. EGR may also be provided via low pressure EGR system 75. Low pressure EGR system 75 includes EGR passage 77 and EGR valve 76. Low pressure EGR may flow from downstream of emissions device 72 to a location upstream of compressor 162. Low pressure EGR system 75 may include an EGR cooler 74.

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Read-only memory 106 may include a plurality of software modules 106a that perform specific engine control functions (e.g., fuel injection control, EGR control, emissions control). Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a torque or power demand pedal 130 for sensing pedal position adjusted by human foot 132; a measurement of engine manifold pressure (MAP) from pressure sensor 121 coupled to intake manifold 44 (alternatively or in addition sensor 121 may sense intake manifold temperature); boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined. In addition, controller 12 may receive input from other sensors 109 including but not limited to fuel rail pressure sensor, exhaust manifold pressure sensor, turbine speed sensor, and exhaust temperature sensor.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle.

In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Thus, the system of FIG. 1 provides for an engine system, comprising: an internal combustion engine including a turbocharger; and a controller including executable instructions stored in non-transitory memory that cause the controller to adjust output of the turbocharger via a reference control system and a disturbance rejection control system, the reference control system including gains that cause output of the turbocharger to change at a first rate during increases in engine speed and that cause the output of the turbocharger to change at a second rate during reductions in engine speed. The engine system includes where the first rate is less than the second rate. The engine system includes where the reference control system does not include integral feedback. The engine system includes where the disturbance rejection control system does include integral feedback. The engine system includes where adjusting output of the turbocharger includes adjusting a position of a vane. The engine system includes where adjusting output of the turbocharger includes adjusting a waste gate position. The engine system includes where the disturbance rejection control system rejects an error between a reference trajectory and an actual engine response, and where the reference trajectory is output of the reference control system.

Figure 4:
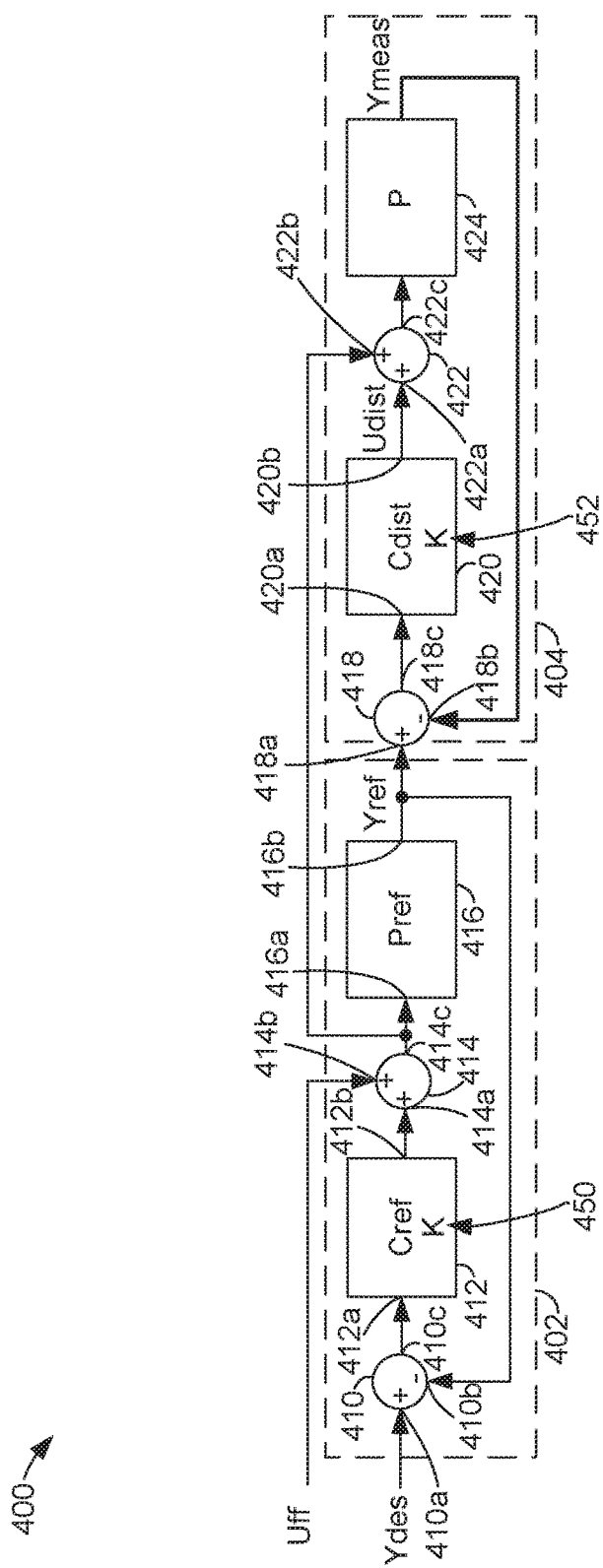
FIG. 4 shows an example controller for adjusting an operating state of an engine.

Turning now to FIG. 2, a prophetic example comparison between output of a prior art control system and the control system of FIG. 4 is shown. The sequence of FIG. 2 illustrates an increase in a boost request. Portions of the sequence may be provided via the system of FIG. 1 and the controller of FIG. 4. The operating sequence of FIG. 2 may be provided via the system of FIG. 1 executing instructions according to the controller of FIG. 4 that are stored in non-transitory memory. Vertical markers t0 and t1 represent times of interest during the sequence. All plots in FIG. 2 are aligned in time and occur at a same time.

The first plot from the top of FIG. 2 is a plot of boost pressure (e.g., pressure in an engine's intake manifold) for an engine system that includes a proportional/integral boost controller. The vertical axis represents boost pressure and boost pressure increases in the direction of the vertical axis arrow. The horizontal axis represents time and time increases from the left side of the plot to the right side of the plot. Curve 202 represents the engine boost pressure. Curve 250 represents the commanded boost pressure.

The second plot from the top of FIG. 2 is a plot of boost pressure for an engine control system that includes a proportional boost controller without integral feedback. The vertical axis represents boost pressure and boost pressure increases in the direction of the vertical axis arrow. The horizontal axis represents time and time increases from the left side of the plot to the right side of the plot. Curve 204 represents the engine boost pressure for the engine control system that includes proportional control without integral feedback. Curve 252 represents the commanded boost pressure.

The third plot from the top of FIG. 2 is a plot of engine pumping power for an engine system that includes a proportional/integral boost controller. The vertical axis represents engine pumping power and engine pumping power increases in the direction of the vertical axis arrow. The horizontal axis represents time and time increases from the left side of the plot to the right side of the plot. Curve 206 represents the engine pumping power. Curve 254 represents the expected engine pumping power.

The fourth plot from the top of FIG. 2 is a plot of engine pumping power for an engine system that includes a proportional boost controller without integral feedback (e.g., the controller of FIG. 4). The vertical axis represents engine pumping power for the system without integral feedback and engine pumping power increases in the direction of the vertical axis arrow. The horizontal axis represents time and time increases from the left side of the plot to the right side of the plot. Curve 208 represents the engine pumping power. Curve 256 represents the expected engine pumping power.

The fifth plot from the top of FIG. 2 is a plot of cumulative engine pumping work since the boost pressure increase request for the engine system that includes a proportional boost controller with integral feedback versus time. The vertical axis represents cumulative engine pumping work and cumulative engine pumping work increases in the direction of the vertical axis arrow. The cumulative engine pumping work does not increase after a transient boost condition completes. The horizontal axis represents time and time increases from the left side of the plot to the right side of the plot. Curve 210 represents engine pumping work.

The sixth plot from the top of FIG. 2 is a plot of cumulative engine pumping work since the boost pressure increase request for the engine system that includes a proportional boost controller without integral feedback versus time. The vertical axis represents cumulative engine pumping work and cumulative engine pumping work increases in the direction of the vertical axis arrow. The cumulative engine pumping work does not increase after a transient boost condition completes. The horizontal axis represents time and time increases from the left side of the plot to the right side of the plot. Curve 212 represents engine pumping work.

At time t0, the boost pressure for the system that includes a proportional boost controller with integral feedback is low. Likewise, the boost pressure for the system that includes a proportional boost controller without integral feedback is low. The engine pumping power for the system that includes the proportional boost controller with integral feedback is low. Similarly, the engine pumping power for the system that includes the proportional boost controller without integral feedback is low. The cumulative engine pumping work for the system that includes proportional boost controller with integral feedback is zero. Further, cumulative engine pumping work for the system that includes proportional boost controller without integral feedback is zero.

At time t1, an increase in boost pressure is commanded for both systems. The boost pressure of the system that includes the proportional boost controller with integral feedback increases after time t1 and it overshoots (e.g., goes above) the commanded boost pressure before finally settling to the level of the requested boost pressure. The boost pressure of the system that includes the proportional boost controller without integral feedback increases after time t1 and it converges to the level of the requested boost pressure without overshooting the requested boost pressure.

The engine pumping power for the system that includes the proportional boost controller with integral feedback increases after time t1 and it exceeds the expected engine pumping power. The engine pumping power for the system that includes the proportional boost controller with integral feedback converges to the expected engine pumping power after time t1. The engine pumping power for the system that includes the proportional boost controller without integral feedback increases after time t1 and it exceeds the expected engine pumping power by a small amount. The engine pumping power for the system that includes the proportional boost controller without integral feedback converges to the expected engine pumping power after time t1.

The cumulative engine pumping work for the system that includes the proportional boost controller with integral feedback increases after time t1 and it levels off at a higher level. The cumulative engine pumping power for the system that includes the proportional boost controller without integral feedback increases after time t1 and it levels off at a lower level. Thus, the cumulative engine pumping work for the system that includes the proportional boost controller with integral feedback is greater than the cumulative engine pumping work for the system that includes the proportional boost controller without integral feedback.

Thus, the system that includes the proportional boost controller without integral feedback may converge to a requested boost without overshoot and before a system that includes a proportional boost controller with integral feedback. Accordingly, a system that includes the proportional boost controller without integral feedback may provide advantages over a system that includes system that includes the proportional boost controller with integral feedback.

Referring now to FIG. 3, a prophetic example of boost pressure and engine pumping power during an increase and during a decrease of boost pressure is shown. FIG. 3 shows boost pressure and engine pumping power responses for three different calibrations of a system that includes a proportional boost controller without integral feedback. The responses shown in FIG. 3 may be provided via the system of FIG. 1 and the method of FIG. 4. Vertical markers t10-t12 represent times of interest during the sequence. All plots in FIG. 3 are aligned in time and occur at a same time.

The first plot from the top of FIG. 3 is a plot of engine boost pressure for an engine system that includes a proportional boost controller without integral boost feedback. The engine boost pressure is generated via a proportional boost controller without integral boost feedback that includes a first group of controller gains. The first group of controller gains may be equivalent for when engine speed increases and for when engine speed decreases. The vertical axis represents engine boost pressure and engine boost pressure increases in the direction of the vertical axis arrow. The horizontal axis represents time and time increases from the left side of the plot to the right side of the plot. Curve 302 represents the engine boost pressure.

The second plot from the top of FIG. 3 is a plot of engine boost pressure for an engine system that includes a proportional boost controller without integral boost feedback. The engine boost pressure is generated via a proportional boost controller without integral boost feedback that includes a second group of controller gains. The second group of controller gains may be different for when engine speed increases and for when engine speed decreases. The vertical axis represents engine boost pressure and engine boost pressure increases in the direction of the vertical axis arrow. The horizontal axis represents time and time increases from the left side of the plot to the right side of the plot. Curve 304 represents the engine boost pressure.

The third plot from the top of FIG. 3 is a plot of engine boost pressure for an engine system that includes a proportional boost controller without integral boost feedback. The engine boost pressure is generated via a proportional boost controller without integral boost feedback that includes a third group of controller gains. The third group of controller gains may be equivalent for when engine speed increases and for when engine speed decreases. The vertical axis represents engine boost pressure and engine boost pressure increases in the direction of the vertical axis arrow. The horizontal axis represents time and time increases from the left side of the plot to the right side of the plot. Curve 306 represents the engine boost pressure.

The fourth plot from the top of FIG. 3 is a plot of engine pumping work for an engine system that includes a proportional boost controller without integral boost feedback. The engine pumping work is generated via a proportional boost controller without integral boost feedback that includes a first group of controller gains. The first group of controller gains may be equivalent for when engine speed increases and for when engine speed decreases. The vertical axis represents engine pumping power and engine pumping power increases in the direction of the vertical axis arrow. The horizontal axis represents time and time increases from the left side of the plot to the right side of the plot. Curve 308 represents the engine pumping power.

The fifth plot from the top of FIG. 3 is a plot of engine pumping work for an engine system that includes a proportional boost controller without integral boost feedback. The engine pumping work is generated via a proportional boost controller without integral boost feedback that includes a second group of controller gains. The second group of controller gains may be different for when engine speed increases and for when engine speed decreases. The vertical axis represents engine pumping power and engine pumping power increases in the direction of the vertical axis arrow. The horizontal axis represents time and time increases from the left side of the plot to the right side of the plot. Curve 310 represents the engine pumping power.

The sixth plot from the top of FIG. 3 is a plot of engine pumping work for an engine system that includes a proportional boost controller without integral boost feedback. The engine pumping work is generated via a proportional boost controller without integral boost feedback that includes a third group of controller gains. The third group of controller gains may be equivalent for when engine speed increases and for when engine speed decreases. The vertical axis represents engine pumping power and engine pumping power increases in the direction of the vertical axis arrow. The horizontal axis represents time and time increases from the left side of the plot to the right side of the plot. Curve 312 represents the engine pumping power.

At time t10, the boost pressures for the systems that include the first, second, and third groups of controller gains are low. The engine pumping powers for the systems that include the first, second, and third groups of controller gains are also low.

At time t1, an increase in boost pressure is commanded for the three systems. The boost pressures for the system that includes the first group of controller gains rises quickly and its corresponding engine pumping power also increases at a high rate. Although the system that includes the first group of controller gains exhibits a quick boost response, it also exhibits high engine pumping power. Conversely, the boost pressure for the system that includes the third group of controller gains rises at a slower rate and its corresponding engine pumping power is lower than for the controller that includes the first group of controller gains. Thus, the system that includes the third group of controller gains may provide a more optimal response. The boost pressure and engine pumping power for the system that includes the second group of controller gains responds in the same way as the system that includes the third group of controller gains.

At time t2, a decrease in boost pressure is commanded for the three systems. The boost pressures for the system that includes the first group of controller gains declines quickly and its corresponding engine pumping power also decreases at a high rate. On the other hand, the boost pressure for the system that includes the third group of controller gains declines at a slower rate and its corresponding engine pumping power decreases at a slower rate than for the controller that includes the first group of controller gains. Thus, the system that includes the first group of controller gains may provide a more optimal response. The boost pressure and engine pumping power for the system that includes the second group of controller gains responds in the same way as the system that includes the first group of controller gains.

Thus, it may be beneficial to provide a first group of controller gains for an increasing engine speed and load or boost pressure. It may also be beneficial to provide a second group of controller gains for a decreasing engine speed and load or boost pressure.

Referring now to FIG. 4, a controller for an engine is shown. The controller of FIG. 4 may be stored as executable instructions in non-transitory memory of a processor or controller in a system as shown in FIG. 1. The controller of FIG. 4 may be incorporated into and may cooperate with the systems of FIG. 1. Further, the controller of FIG. 4 may be part of a system that transforms operating states of devices and actuators in the physical world. The controller may employ engine actuators of the engine system to adjust engine operation according to the method described below.

Controller 400 is a controller that includes two sub-controllers. The first sub-controller 402 may be referred to as a reference controller. The second sub-controller 404 may be referred to as a disturbance rejection controller.

A feedforward control adjustment input parameter Uff is input to summing junction 414 of reference controller 402 at input 414b. In one example, the feedforward input parameter Uff may be a nominal actuator position (e.g., waste gate position or variable geometry vane position) to achieve the requested steady-state value of variable Ydes. Requested or desired state values Ydes (e.g., a requested boost pressure, pressure difference between the engine's intake manifold and the engine's exhaust manifold, exhaust manifold pressure, and turbine speed) of the plant are input to summing junction 410 at input 410a of reference controller 402. Summing junction 410 subtracts the output of reference controller 402 Yref (e.g., a reference trajectory), which is provided to input 410b, from the requested or desired state values Ydes. In one example, Ydes may be a requested or desired boost pressure and Yref may be a modeled boost pressure. Summing junction 410 passes the result of subtracting Yref from Ydes to input 412a of block 412 via output 410c.

Block 412 may include any linear control law except integral feedback. The linear control law is applied to the input from summing junction 410 (e.g., the control error Ydes-Yref). In one example, block 412 includes a proportional/derivative controller that may be expressed as:

$$PD = Kp \cdot e(t) + Kd \cdot \frac{d}{dt}e(t)$$

where PD is the proportional/derivative controller output, Kp is the proportional gain (e.g., a real number), e(t) is the error (Ydes-Yref) with respect to time, Kd is the derivative gain (e.g., a real number), and d/dt e(t) is the derivative of the error e(t). The PD controller may be implemented in discrete form.

In other examples, the controller of block 412 may be multivariable (e.g., state space form) that includes feedback from multiple engine outputs (e.g., exhaust pressure, boost pressure, turbine speed, pressure across the engine). The gains Kp and Kd may be a function of engine speed and engine load. Further, the gains Kp and Kd may also be a function of a rate of engine speed change and a rate of engine load change. For example, the Kp and Kd gains may be adjusted to command slower boost response during engine speed and/or engine load increases. The Kp and Kd gains may also be adjusted to command faster boost response during engine speed and/or engine load decreases. In one example, two metrics are used to assess engine speed increases and engine speed decreases. The two metrics are a derivative of engine torque request and a high pass filtered version of the engine boost request. The two metrics may reference a table to determine an interpolation factor α (a value between 0 and 1). The factor α may be applied to interpolate between two sets of controller gains (one for increasing speed and one for decreasing speed) Kinc and Kdec. The final proportional gain may be determined via the following equation:

$$Kp=(1-\alpha)K\text{inc}+\alpha K\text{dec}$$

where Kp is the proportional gain, a is an interpolation factor, and Kinc is gain for increasing engine speed, and Kdec is gain for decreasing engine speed. The derivative gain may be determined in a similar way. The output from the linear control law is supplied to input 414a of summing junction 414.

The feedforward values of Uff are input at 414b and they are added to the output of the reference controller 412, which is provided via output 412b to input 414a. The result of adding Uff with the output of the reference controller is output from output 414c of summing junction 414 to input 416a of dynamic engine model 416 and input 422b of summing junction 422. Dynamic engine model 416 outputs a reference trajectory of an engine state (e.g., a reference boost pressure, a reference exhaust manifold pressure, etc.) at output 416b. The reference trajectory is feedback to input 410b of summing junction 410. In addition, the reference trajectory is delivered to input 418a of summing junction 418. Summing junction 418 subtracts an actual or measured value of an engine state (e.g., boost pressure, exhaust pressure, etc.) from the reference trajectory that is output from dynamic engine model 416 and the result is provided to disturbance rejection controller 420 via output 418c. In particular, the output from summing junction 418 is delivered to input 420a of disturbance rejection controller 420.

The disturbance rejection controller 420 rejects the error between the reference trajectory output from the dynamic engine model 416 and the actual engine response (e.g., measured boost pressure, exhaust manifold pressure, pressure drop across the engine, turbine speed, etc.). The disturbance controller may include any linear control law and integral feedback. In one example, the disturbance rejection controller may be a proportional/integral controller of the form:

$$PI = Kp \cdot e(t) + Ki \cdot \int_0^t e(t)dt$$

where PI is the proportional/integral controller output, Kp is the proportional gain (e.g., a real number), e(t) is the error (Yref−Ymeas) with respect to time, Ki is the integral gain (e.g., a real number). The PI controller may be implemented in discrete form. The disturbance rejection controller is applied to the output of summing junction 418 and the result is supplied to input 422a of summing junction 422 via output 420b. Summing junction 422 adds the output of disturbance controller 420 to the output of summing junction 414. Summing junction 422 provides a sum of the output of summing junction 414 and the output of disturbance controller 420 to plant or engine 424 via output 422c. In particular, states of one or more engine actuators (e.g., waste gate, variable geometry vane controller, etc.) are commanded via the output 422c of summing junction 422. One or more engine operating states are measured (e.g., Ymeas) and returned to input 418b of summing junction 418.

Thus, controller 400 includes two sub-controllers including a reference controller 412 and a disturbance rejection controller. The reference controller 412 provides input to the disturbance rejection controller, and the disturbance rejection controller adjusts one or more actuators of the engine. In addition, the reference controller 402 may include gains 450 and the disturbance controller 404 may include gains 452 for adjusting the response of the system.

The controllers of FIG. 4 provide for a method for operating an engine, comprising: adjusting a state of the engine via a reference control system and a disturbance rejection control system, where the reference control system does not include integral feedback and where the disturbance rejection control system includes integral feedback. The method includes where the state of the engine is a boost pressure, and/or an exhaust manifold pressure, and/or a turbine speed, and/or a pressure drop across the engine. The method includes where the state of the engine is an exhaust temperature. The method includes where the state of the engine is a fuel rail pressure. The engine method includes where the reference control system generates a reference trajectory based on a requested boost pressure and where the disturbance rejection control system rejects error between the reference trajectory and an actual boost pressure. The engine includes where the reference control system is coupled to the disturbance rejection control system. The engine includes where the reference controller includes a proportional/derivative controller. The engine method includes where the disturbance rejection control system includes a proportional/integral controller.

The controllers of FIG. 4 also provide for a method for operating an engine, comprising: adjusting a state of the engine via a reference control system and a disturbance rejection control system, where the reference control system does not include integral feedback and where the disturbance rejection control system includes integral feedback, and where the disturbance rejection control system includes input of a sum of a feedforward term and output of a reference controller. The engine method includes where the reference controller includes gains that cause output of a turbocharger to change at a first rate during increases in engine speed and that cause the output of the turbocharger to change at a second rate during reductions in engine speed. The engine method includes where the reference control system responds to difference between a reference trajectory and a desired boost pressure. The engine method includes where the disturbance rejection control system responds to difference between a reference trajectory and an actual engine response. The engine method includes where the actual engine response is an actual boost pressure change.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine, comprising:
adjusting a state of the engine via a reference control system and a disturbance rejection control system, where the reference control system does not include integral feedback and where the disturbance rejection control system includes integral feedback.

2. The method of claim 1, where the state of the engine is at least one of a boost pressure, turbine speed, pressure drop across the engine, and exhaust manifold pressure.

3. The method of claim 1, where the state of the engine is an exhaust temperature.

4. The method of claim 1, where the state of the engine is a fuel rail pressure.

5. The engine method of claim 1, where the reference control system generates a reference trajectory based on a requested boost pressure and where the disturbance rejection control system rejects error between the reference trajectory and an actual boost pressure.

6. The engine method of claim 5, where the reference control system is coupled to the disturbance rejection control system.

7. The engine method of claim 1, where the reference controller includes a proportional/derivative controller.

8. The engine method of claim 1, where the disturbance rejection control system includes a proportional/integral controller.

9. An engine system, comprising:
an internal combustion engine including a turbocharger; and
a controller including executable instructions stored in non-transitory memory that cause the controller to adjust output of the turbocharger via a reference control system and a disturbance rejection control system, the reference control system including gains that cause output of the turbocharger to change at a first rate during increases in engine speed and that cause the output of the turbocharger to change at a second rate during reductions in engine speed.

10. The engine system of claim 9, where the first rate is less than the second rate.

11. The engine system of claim 9, where the reference control system does not include integral feedback.

12. The engine system of claim 11, where the disturbance rejection control system does include integral feedback.

13. The engine system of claim 9, where adjusting output of the turbocharger includes adjusting a position of a vane.

14. The engine system of claim 9, where adjusting output of the turbocharger includes adjusting a waste gate position.

15. The engine system of claim 9, where the disturbance rejection control system rejects an error between a reference trajectory and an actual engine response, and where the reference trajectory is output of the reference control system.

16. A method for operating an engine, comprising:
adjusting a state of the engine via a reference control system and a disturbance rejection control system, where the reference control system does not include integral feedback and where the disturbance rejection control system includes integral feedback, and where the disturbance rejection control system includes input of a sum of a feedforward term and output of a reference controller.

17. The engine method of claim 16, where the reference controller includes gains that cause output of a turbocharger to change at a first rate during increases in engine speed and that cause the output of the turbocharger to change at a second rate during reductions in engine speed.

18. The engine method of claim 17, where the reference control system responds to difference between a reference trajectory and a desired boost pressure.

19. The engine method of claim 18, where the disturbance rejection control system responds to difference between a reference trajectory and an actual engine response.

20. The engine method of claim 19, where the actual engine response is an actual boost pressure change.

* * * * *